United States Patent [19]

Meyer

[11] Patent Number: 5,060,765
[45] Date of Patent: Oct. 29, 1991

[54] ACTUATING DEVICE WITH AUTOMATIC READJUSTMENT FOR A VEHICLE BRAKE

[75] Inventor: Manfred Meyer, Gillenfeld, Fed. Rep. of Germany

[73] Assignee: Lucas Industries public limited company, Birmingham, England

[21] Appl. No.: 573,212

[22] PCT Filed: Jan. 11, 1990

[86] PCT No.: PCT/EP90/00062

§ 371 Date: Aug. 8, 1990

§ 102(e) Date: Aug. 8, 1990

[87] PCT Pub. No.: WO90/08270

PCT Pub. Date: Jul. 26, 1990

[30] Foreign Application Priority Data

Jan. 11, 1989 [DE] Fed. Rep. of Germany ... 8900277[U]

[51] Int. Cl.$^5$ .............................................. F16D 65/56
[52] U.S. Cl. .................. 188/71.9; 188/72.6; 188/72.7; 188/106 F; 188/196 D; 192/70.23; 192/70.25; 192/93 R; 192/111 A
[58] Field of Search ............. 188/72.7, 71.9, 72.6, 188/106 F, 196 D; 192/70.23, 70.25, 93 R, 111 A

[56] References Cited

U.S. PATENT DOCUMENTS 3,701,400 10/1972 Burnett et al. .................. 188/72.6
3,765,513 10/1973 Brooks .
3,991,859 11/1976 Coulter et al. .
4,596,315 6/1986 Takeuchi et al. .................. 188/71.9

FOREIGN PATENT DOCUMENTS

2143575 3/1973 Fed. Rep. of Germany .
2408706 9/1974 Fed. Rep. of Germany .

Primary Examiner—George E. A. Halvosa
Attorney, Agent, or Firm—Oblon, Spivak, McClelland, Maier & Neustadt

[57] ABSTRACT

A one-piece casing (20) comprising a bottom (22) and a shell (24) formed with a cylindrical bore (26) houses a piston (30) for hydraulic actuation of a brake. For mechanical parking brake actuation, a shaft (34) is supported in the bottom (22) of the casing and a ramp arrangement (50) is rotatable by the shaft, thereby being displaceable axially away from a ramp arrangement (40) which is secured to the casing. Two strut members (60,64) which are screwed together constitute an adjustable strut between the axially adjustable ramp arrangement (50) and the piston (30). A return spring (90) is positioned under axial bias between a thrust bearing (92) secured to the casing and a thrust bearing (58) at one of the two strut members (60). The thrust bearing (92) which is secured to the casing is formed at an insert (84) by which one of the strut members (60) is guided non-rotatably. The ramp arrangement (40) which is secured to the casing as well as the insert (84) are retained against axial displacement in the casing (20) by a common fastening member (96) and are prevented from rotating by a common twist preventing element (42).

10 Claims, 6 Drawing Sheets

ACTUATING DEVICE WITH AUTOMATIC READJUSTMENT FOR A VEHICLE BRAKE

The invention relates to an actuating device with automatic readjustment for a vehicle brake, especially a disc brake, comprising a casing which includes a bottom and a shell formed with a cylindrical bore which is open toward the brake, a piston which is displaceable hydraulically within the cylindrical bore to actuate the brake, a shaft for mechanical parking brake application which is rotatably supported in the bottom of the casing, coaxially with the piston, and sealed, two ramp arrangements, one being secured to the casing and the other one rotatable by means of the shaft, thus being adjustable axially away from the bottom of the casing, a pair of strut members screwed together so as to form an adjustable strut between the axially adjustable ramp arrangement and the piston, and a return spring which is positioned under axial bias between a thrust bearing secured to the casing and a thrust bearing at one of the two strut members and tends to keep the adjustable ramp arrangement in an inoperative position.

Figure 1:
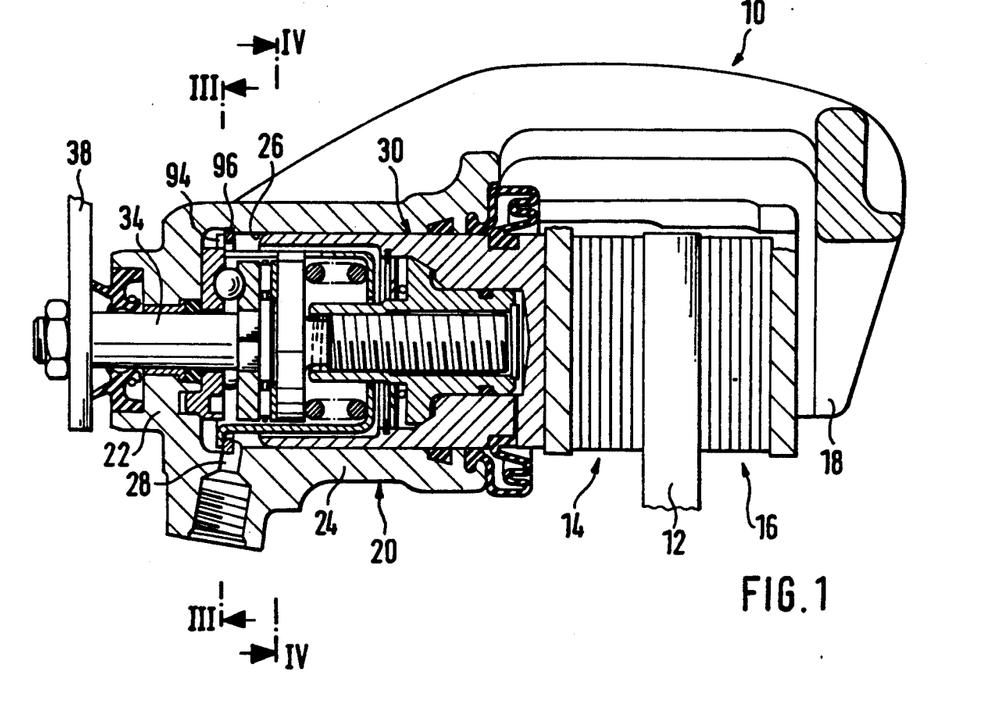
FIG. 1 shows an axial section of a spot-type disc brake with a first actuating device according to the invention.
Figure 2:
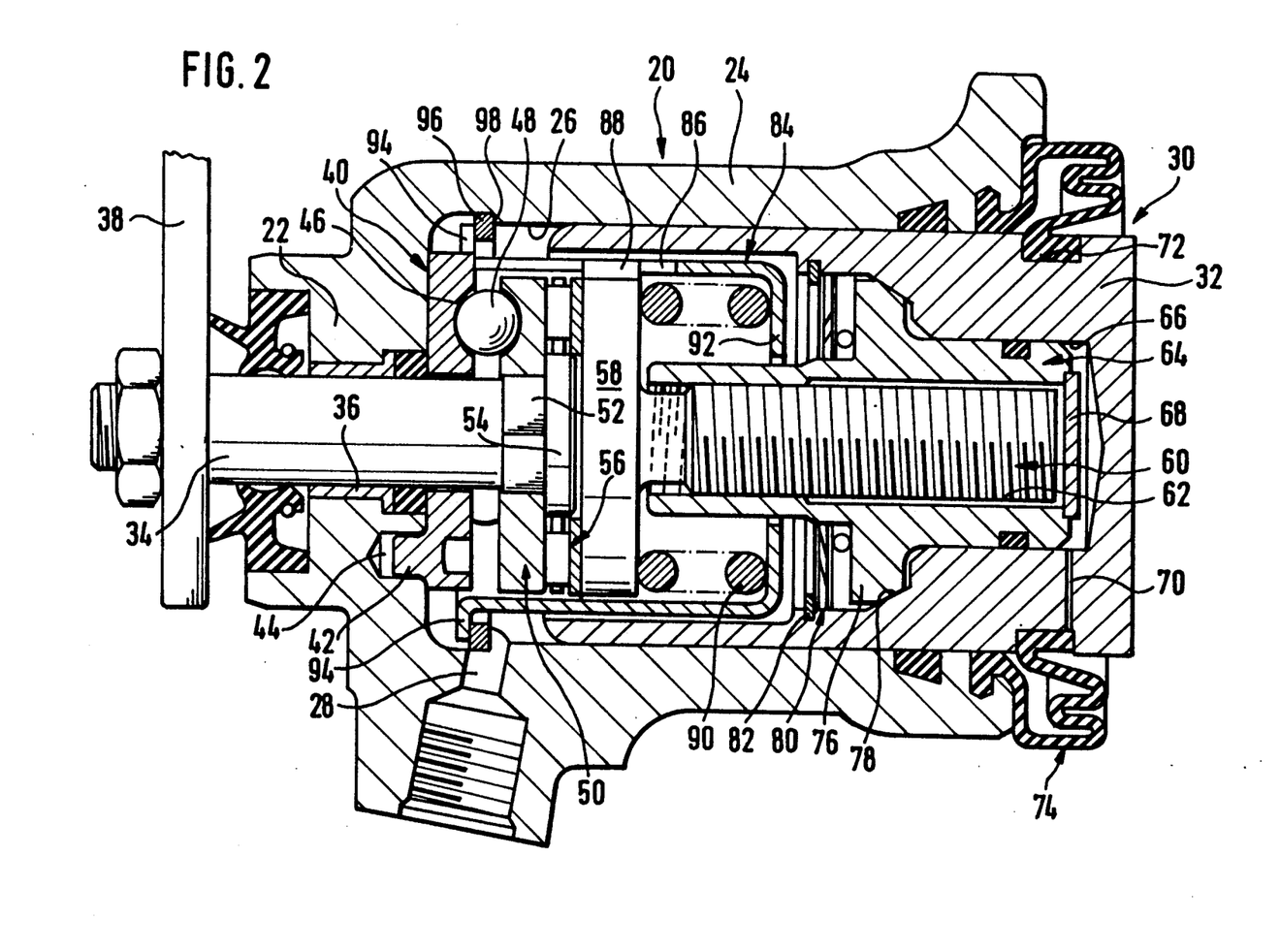
FIG. 2 shows an enlarged cutout of FIG. 1.
Figure 3:
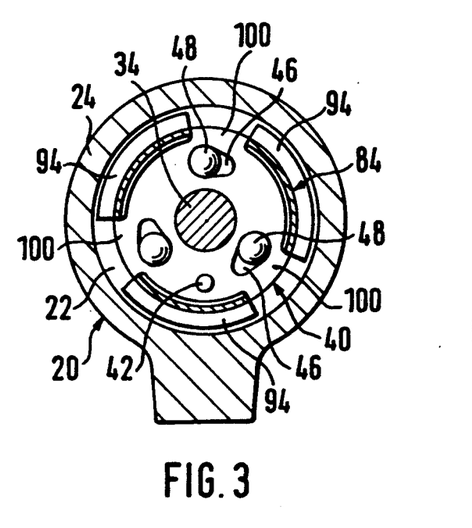
FIG. 3 the cross section III—III of FIG. 1.
Figure 4:
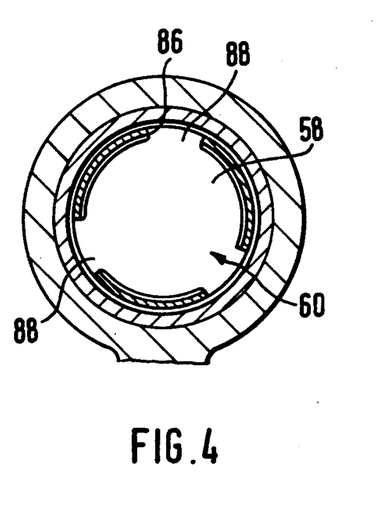
FIG. 4 the cross section IV—IV of FIG. 1.
Figure 5:
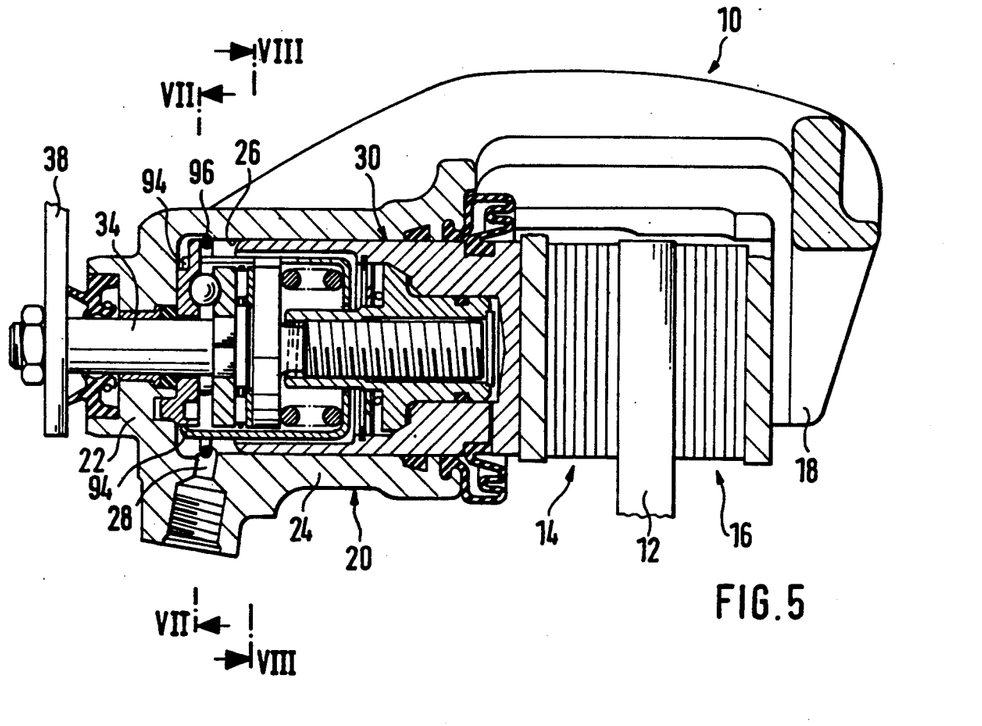
FIG. 5 an axial section corresponding to FIG. 1 of a modified spot-type disc brake, as compared to FIGS. 1 to 4, with a second actuating device according to the invention.
Figure 6:
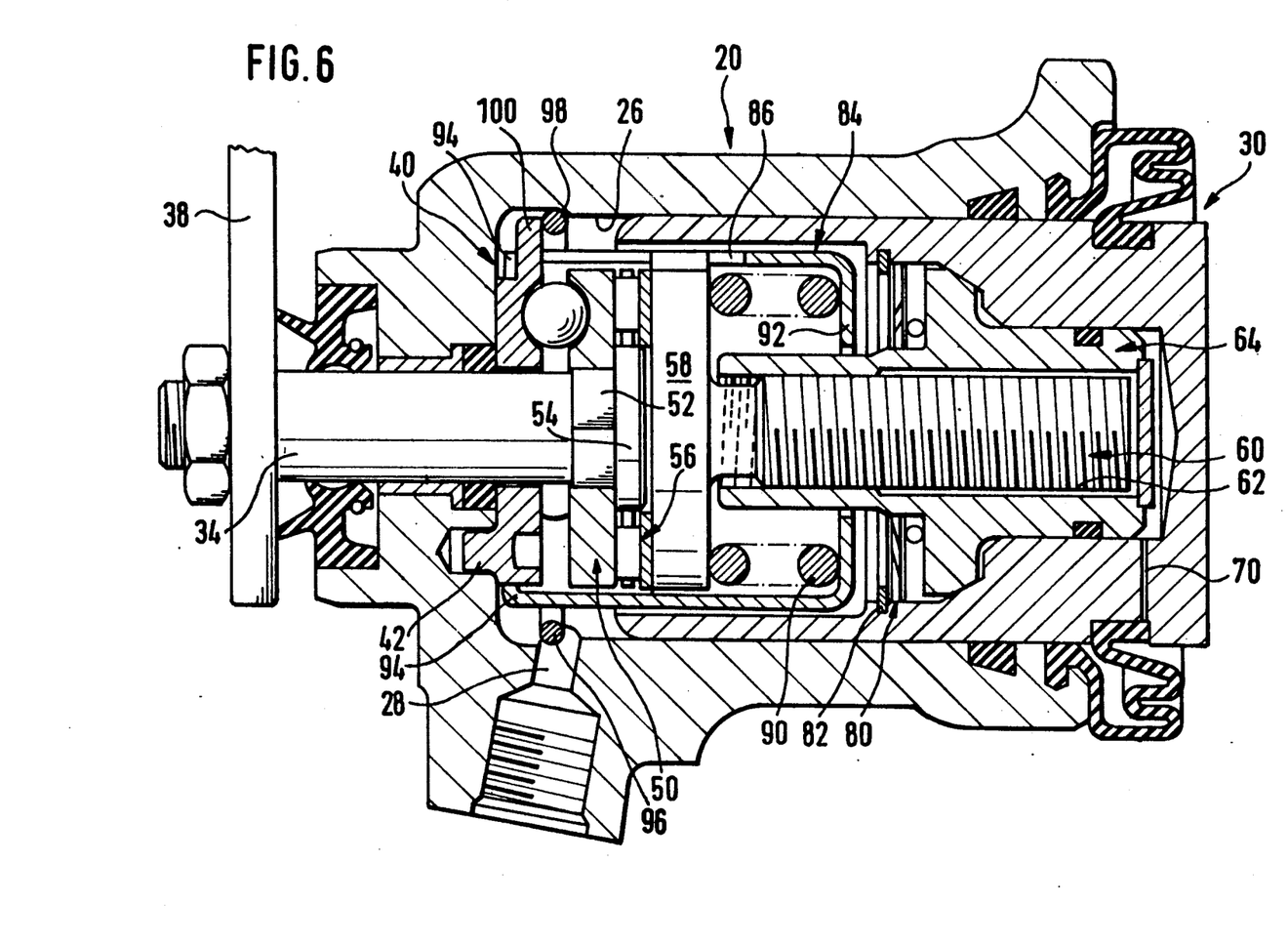
FIG. 6 shows an enlarged cutout of FIG. 5.
Figure 7:
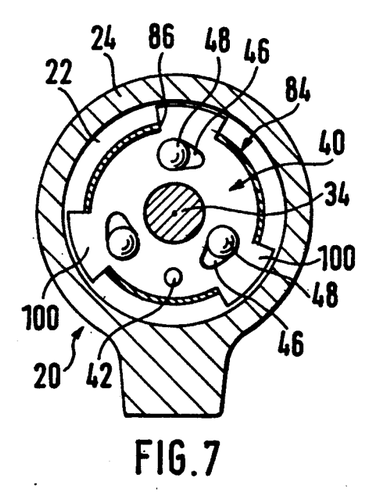
FIG. 7 shows the cross section VII—VII of FIG. 5.
Figure 8:
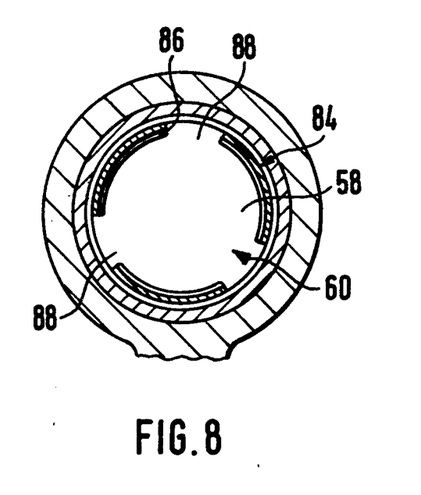
FIG. 8 shows the cross section VIII—VIII of FIG. 5.

In a known actuator of this kind (DE-A-24 08 706, especially FIG. 6) the bottom of the casing is a structural member made separately from the casing and then screwed to the same. The ramp arrangement which is secured to the casing is formed directly at the axially inner side of said member. The thrust bearing which is secured to the casing is formed at an intermediate annular wall which is formed in one piece with the casing and separates the cylindrical bore from a rear space housing the adjustable ramp arrangement, a thrust bearing at one of the two strut members, and an axial load bearing disposed between said strut member and the adjustable ramp arrangement.

The first strut member is rotatable and has an irreversible external thread by which it is screwed into the sleeve-like second strut member. The second strut member is guided for axial displacement within the cup-shaped piston but is non-rotatable and biased by an additional spring with respect to the piston in the actuating direction of the piston. The first strut member is connected to the adjustable ramp arrangement by a directional locking mechanism. Furthermore, the first strut member is embodied by an auxiliary hydraulic piston guided sealingly in the annular intermediate wall of the casing and arranged such that readjustment is prevented when the hydraulic pressure in the cylindrical bore has reached a value at which elastic deformations of parts of the brake are to be expected.

This known actuating device requires considerable finishing and mounting expenditure and practically cannot be installed in casings whose cylinder bore has a diameter of no more than 40 mm or less. The diameter of the cylindrical bore at the front wheels of motor vehicles admittedly usually is much greater, for example 60 mm. However, as the front wheels normally are steerable, there is generally not enough space to mount a disc brake with optional hydraulic and mechanical actuation. For this reason front wheel brakes so far usually were not provided with an hydraulic actuating device and in addition with a mechanical actuator so as to be useful as parking brakes. In view of the usual load distribution, on the other hand, with the front wheels normally being loaded by more than 50% of the weight of the vehicle, it is desirable in general to select a relatively small diameter for the cylinder bore of hydraulic actuators at rear wheel brakes. For example, in the case of passenger cars, at the rear wheel brakes the bore and piston diameter may be 38 mm and it may be 62 mm at the front wheel brakes so as to avoid overbraking of the rear wheels. That is why it is difficult with rear wheel brakes to find room for a combined hydraulic and mechanical actuating device which is sufficiently strong in dimension and automatically readjustable so as to be just as well suited for completely safe parking braking as it is for operational braking.

In the case of another known hydraulic and mechanical actuating device with automatic readjustment (DE-A-21 43 575) the piston likewise is formed with a cavity which houses two strut members interconnected by screw threads and a return spring. The two strut members have coarse threads and are biased against each other in axial direction by the return spring which, on the one hand, is supported through an axial load bearing on a head of one of the two strut members and, on the other hand, rests on a thrust bearing secured to the casing. The thrust bearing secured to the casing is embodied by the bottom of a cup-shaped insert engaged by a radially outer flange in an annular groove in the casing and otherwise almost completely taken up in the cavity formed in the piston. A shaft is provided for the mechanical actuation. It is supported in the casing, transversely of the axial direction of the piston, and presses against a hand brake piston by a tappet supported eccentrically on the shaft. The piston of the hand brake is guided coaxially with the hydraulically operable piston in the casing and, having overcome brake release clearance, comes to rest by way of a conical coupling on the head of the first strut member.

With this known actuating device, it is costly to make the transversely extending bore for the shaft, and the mechanical transmission of power from this shaft via the tappet to the hand brake piston is of low efficiency. The usual demand that the driver of a passenger car be able to effect reliable hand braking by a manual force of no more than 20 kp exerted at a hand brake lever with an actuating path of no more than 15 cm can be met by this known actuating device for small and medium size passenger cars only but not for cars of the higher weight class. An auxiliary piston is not provided which would prevent readjustment when the brake is loaded heavily and therefore deformed elastically. Besides, there hardly should be room for it in this known actuator.

It is the object of the invention to develop a combined hydraulical and mechanical actuating device with automatic readjustment for a vehicle brake, especially a disc brake such that it can be assembled easily, housed even in a small casing which has a cylinder diameter of, for instance, 40 mm or less, and can be actuated mechanically in highly efficient manner.

The object is met, in accordance with the invention, in an actuating device of the kind specified initially in that the bottom of the casing is made in one piece with the shell of the casing, the ramp arrangement which is secured to the casing is a plate which is separate from the bottom of the casing and supported by the same, the thrust bearing which is secured to the casing is formed at an insert guiding one of the strut members in on-rotatable manner, and the ramp arrangement which is secured to the casing as well as the insert are held against axial displacement in the casing by a common fastening member and prevented from rotating by a common twist preventing means.

The manufacture and finishing of the casing are simplified as compared to the known actuator described above because the bottom of the casing is formed in one piece with the shell thereof. In particular, the casing may be cast in one piece. The risk of shrink holes forming in that process can be eliminated to a large extent since the casing can be designed so that any greater accumulations of material are avoided. The common fastening of the separately produced ramp arrangement secured to the casing and of the insert with the thrust bearing secured to the casing requires but a simple mounting operation which lends itself to mechanization.

Advantageous modifications of the invention may be taken from the subclaims. Of particular advantage are those features which permit the insert to be combined in an assembly group, outside of the casing, with the two ramp arrangements, the return spring, and the strut member which supports the return spring, the assembly being held together by fixing the insert at the plate which is provided as the ramp arrangement secured to the casing. Thus the assembly can be introduced as whole into the cylindrical bore. When assembling this group, a desired bias of the return spring can be adjusted precisely and set permanently.

Embodiments of the invention will be described in greater detail below with reference to diagrammatic drawings, in which.

The three embodiments illustrated in FIGS. 1 to 4, FIGS. 5 to 8, and FIGS. 9 to 12, respectively, will be described together; differences will be explained subsequently.

Each of the spot-type disc brakes shown comprises a floating caliper 10 which is guided in the usual manner by a carrier (not shown) for displacement parallel to the axis of a brake disc 12. The floating caliper 10 extends across the brake disc 12 and two brake pads 14 and 16 of which the first brake pad 14 is adapted to be applied directly to the brake disc 12 by the actuator to be described below. That causes reactive forces which shift the floating caliper 10 such that a leg 18 which is formed at the caliper will apply also the second brake pad 16 against the brake disc 12.

The actuating device comprises a casing 20 made in one piece, for instance by casting, and having a bottom 22 and a shell 24 formed with a cylindrical bore 26 which is open toward the brake disc 12 and an inlet duct 28 to communicate with a master cylinder. The cylindrical bore 26 guides a cup-shaped piston 30 which has a closed outer end wall 32 with an abutment surface for the brake pad 14.

A shaft 34 for mechanical brake actuation is supported rotatably and so as to be displaceable axially in a bearing bush 36 in the bottom 22 of the casing, coaxially with the piston 30. A lever 38 connected in the usual manner, such as by a Bowden cable to a parking brake lever or pedal is fixed to the outer end of the shaft 34. A ramp arrangement 40, secured to the casing, rests on inner side of the bottom 22. Being of the shape of an annular plate, it is slid and centered on the shaft 34 and secured against rotation at the casing 20 by twist preventing means 42. In the case of the first and second embodiments the twist preventing means 42 is embodied by a pin formed by stamping or so-called dislodging and engaging in a paraxial blind hole 44 in the bottom 22 of the casing.

The ramp arrangement 40 which is secured to the casing is formed with three tub-like ramps 46 which are elongated in circumferential direction and each receive a spreader 48 of spherical shape in the embodiments shown. The spreaders 48 each cooperate with a corresponding ramp of another ramp arrangement 50 which is adjustable and likewise of annular disc shape. In the case of the first and second embodiments this ramp arrangement is slid on a profiled section 52 of shaft 34, having for instance a multi-edge or multi-groove profile. The shaft 34 has a head 54 which centers an axial load bearing 56. The axial load bearing 56 of the first and second embodiments is a needle bearing. By way of the axial load bearing 56, the adjustable ramp arrangement 50 is supported in axial direction, against the pressure exerted by the spreaders 48, on a thrust bearing 58 formed at a bolt-like strut member 60.

The bolt-like strut member 60 is threadedly engaged with a sleeve-like strut member 64 by means of a pair of coarse threads 62 which are not self-locking and have a precisely determined thread clearance. The two members together present a strut which is coaxial with the piston 30 and the shaft 34 and the effective length of which is increasable in accordance with the gradually progressive wear of the linings of the brake pads 14 and 16. The sleeve-like strut member 64 is designed as an auxiliary piston which is guided for displacement in a corresponding auxiliary cylindrical bore 66 in the piston 30.

The end of the sleeve-like strut member 64 facing the end wall 32 is tightly closed by a bottom plate 68. To assure that the part of the auxiliary cylindrical bore 66 defined by this bottom plate 68 and the end wall 32 remains pressureless at all times, it is connected through a radial relief passage 70 to an outer groove 72 formed in the piston 30. The groove 72 receives one end of a bellows 74 which establishes a connection between the end of the piston 30 protruding from the cylindrical bore 26 and the casing 20, thereby protecting the cylindrical bore 26 from contamination.

The sleeve-like strut member 64 is formed with a conical flange 76 associated with an internal cone 78 in the piston 30. Inside the piston 30 a set of spring washers 80 is placed under axial bias between the flange 76 and a locking ring 82. The set of spring washers 80 normally holds the flange 76 in abutment against the internal cone 78, thereby preventing rotation of the sleeve-like strut member 64 with respect to the piston 30. The piston 30 itself usually is prevented from rotating by customary means, such as its cooperation with the brake pad 14.

A sleeve- or cage-like insert 84 fixed to the casing 20 so as not to be displaceable axially or rotatable, is received within the cylindrical bore 26—and largely within the cup-shaped piston 30. The insert 84, for example a deep-drawn sheet metal component, is designed such that the bolt-like strut member 60 is prevented by the insert 84 from rotating, while it is not prevented from being shifted axially. In the embodiments shown, the insert 84 has three longitudinal grooves 86 each engaged by a radial projection 88 of the thrust bearing 58.

One end of a return spring 90, a helical wire spring in the embodiment shown, rests on the side of the thrust bearing 58 remote from the axial load bearing 56. Its other end is supported on a thrust bearing 92 secured to the casing and constituted by a radially inwardly projecting flange of the insert 84. The return spring 90, biased by a certain force of, for example, 50 kp, tends to keep the adjustable ramp arrangement 50 in the position which is closest to the ramp arrangement 40 secured to the casing, the inoperative position.

For fixing purposes, the insert 84 is formed with a base edge 94 which cooperates with a radially resilient, annular fastening member 96, the cooperation being direct with the first embodiment and indirect with the second. The fastening member 96 is fitted in snap engagement behind an internal shoulder 98 near the transition from the cylindrical bore 26 to the bottom 22 of the casing. The internal shoulder 98 extends transverely through the mouth of the inlet duct 28 into the cylindrical bore 26 so that a tool, such as a slender screw driver may be introduced from outside into the inlet duct 28 to press the fastening member 98 radially inwardly, thereby disengaging it.

Differences between the first and second embodiments shown in the drawings of an actuating device are that the annular fastening member 96 of FIGS. 1 to 4 is of square cross section and the internal shoulder 98 lies in a plane which is normal to the axis of the cylindrical bore 26, whereas the fastening member 96 according to FIGS. 5 to 8 is round in cross section and the internal shoulder 98 is a conical surface facing the bottom 22 of the casing.

Another difference between the first and second actuating devices is that the base edge 94 of the insert 84 according to FIGS. 1 to 4 projects radially outwardly and directly behind the annular fastening member 96. Through the return spring 90, the thrust bearing 58, the axial load bearing 56, and the adjustable ramp arrangement 50 with the spreaders 48, the insert 84 presses axially against the ramp arrangement 40 which is secured to the casing so that the latter is prevented from being moved away from the bottom 22 of the casing. The ramp arrangement 40 secured to the casing has three radial projections 100 each engaging in a longitudinal groove 86 of the insert 84 so that the latter is prevented from rotating by the ramp arrangement 40 secured to the casing.

In the second embodiment according to FIGS. 5 to 8 the base edge 94 of the insert 84 is bent radially inwardly, engaging behind the ramp arrangement 40. The radial projections 100 of the latter are prevented indirectly by the corresponding fastening member 96 from moving axially. Again the radial projections 100 of the ramp arrangement 40 secured to the casing each engage in a longitudinal groove 86 of the insert 84, whereby the latter is fixed against rotation.

The connection shown in FIGS. 5 to 8 between the insert 84 and the ramp arrangement 40 has the advantage that it can be made outside of the casing 20 by combining the insert 84 with the shaft 34, the two ramp arrangements 40 and 50, including the spreaders 48 in between, and the axial load bearing 56, the bolt-like strut member 60, and the return spring 90 to present an assembly which can be mounted also mechanically and then pushed into the casing 20. Subsequently, the sleeve-like strut member 64 is inserted into the piston 30, together with the set of spring washers 80, and then secured by the locking ring 82. Thereupon the piston 30 is pushed into the cylindrical bore 26, being turned at the same time, so that the strut members 60 and 64 are threadedly engaged. Finally, the bellows 74, having previously being attached to the casing 20, is fixed also to the piston 30.

Figure 9:
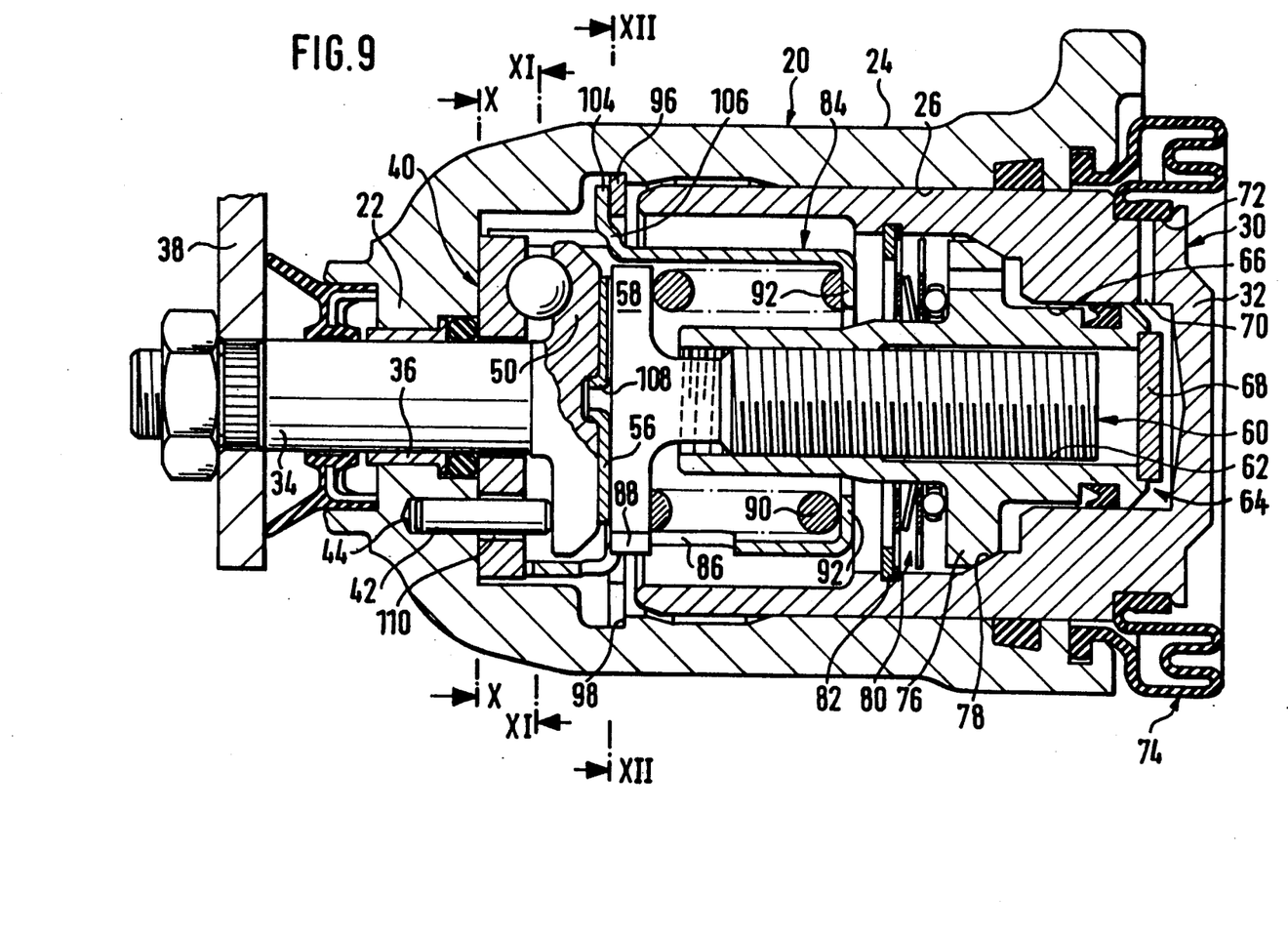
FIG. 9 shows an axial section corresponding to FIGS. 2 and 6 of a third actuating device according to the invention.
Figure 10:
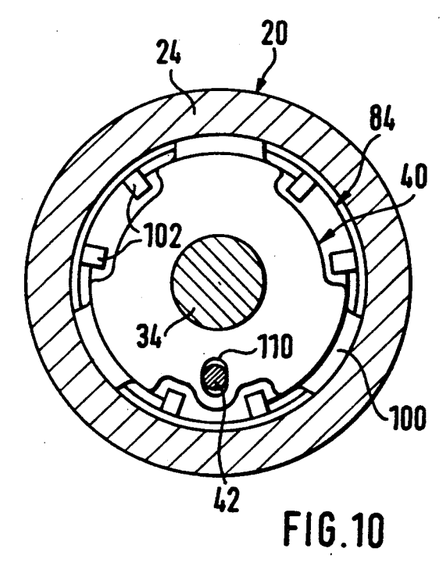
FIG. 10 shows the cross section X—X of FIG. 9.
Figure 11:
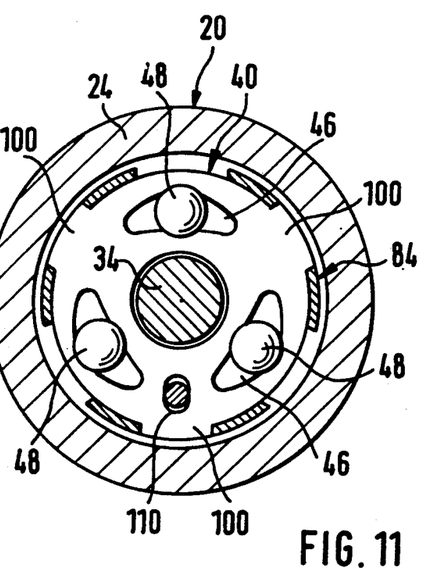
FIG. 11 the cross section XI—XI of FIG. 9.
Figure 12:
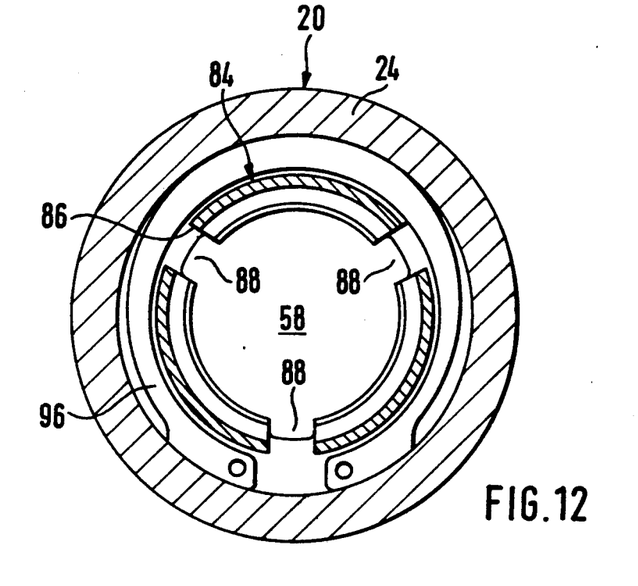
FIG. 12 shows the cross section XII—XII of FIG. 9.

The third embodiment of a brake actuating device, shown in FIGS. 9 to 12, again comprises a deep-drawn sheet metal insert 84 combining design features of the two embodiments described previously. Similar to FIGS. 5 to 8, the insert 84 of FIGS. 9 to 12 includes a number of lugs 102 at its end remote from the thrust bearing 92; they are bent radially inwardly and engage behind the ramp arrangement 40 which is secured to the casing, whereby the latter is combined with the axially movable and rotatable ramp arrangement 50 as well as the bolt-like strut member 60, the axial load bearing 56, and the return spring 90 to present an assembly which can be composed outside of the casing 20 and then installed as a unit. On the other hand, the embodiment according to FIGS. 9 to 12 is comparable with the one shown in FIGS. 1 to 4 in that the insert 84 is fixed to the casing 20 by a fastening member 96 in the form of a standard locking ring. To this end, as shown in FIG. 9, the insert 84 has lugs 104 in the form of outwardly directed edges engaging behind the fastening member 96.

The insert 84 is formed in the area of those lugs 104 with an annular shoulder or cranked portion 106. The entire part of the insert 84 to the right of this cranked portion, located substantially within the piston 30, has a notably smaller diameter than the interior space of the piston 30. Therefore, the insert 84 can be used also together with a piston 30 of such small diameter as is customary, for instance, with the rear wheel brakes of small passenger cars. However, that part of the insert 84 beyond the cranked portion 106, as seen from the piston 30, has substantially the same diameter as in the case of the embodiment according to FIGS. 5 to 8 so that the insert 84 encloses the adjustable ramp arrangement 50 without touching it, in spite of its extreme space-saving structure.

Contrary to the first and second embodiments, the adjustable ramp arrangement 50 is formed in one piece with the shaft 34 and rests on the thrust bearing 58 by way of an axial load bearing 56, as in the case of the embodiments described. According to FIG. 9, however, the axial load bearing 56 is a circular sliding bearing disc. made of sheet steel coated with polytetrafluoroethylene in which a lead-copper mixture is embedded. This sliding bearing disc 56 has a central projection 108 engaging in a corresponding central recess in the adjustable ramp arrangement 50, whereby the sliding bearing disc 56 is centered. The abutment surface for the sliding bearing disc 56 formed at the thrust bearing 58 preferably is slightly crowned spherically and convexly in a manner which cannot be illustrated with the scale of the drawing, and the sliding bearing disc 56 adapts to it. This crowning prevents the thrust bearing 58 from tilting with respect to the ramp arrangement 50 if there should be a fault in the axial alignment of the two due to manufacturing tolerances.

The twist preventing means 42 in accordance with FIGS. 9 to 12 is presented by a paraxial pin which is beaten into the blind bore 44 so as to engage in a hole 110 which is oblong in radial direction and provided in the ramp arrangement 40 which is secured to the casing. There is only very little clearance for the pin 42 in the hole 110 in circumferential direction of the ramp arrangement 40 secured to the casing so that the ramp arrangement is retained practically without any clearance in circumferential direction. In radial direction, however, the ramp arrangement 40 secured to the casing does have considerable clearance, both with respect to the shaft 34 and the hole 110. Therefore, it is left to the three spherical spreaders 48 to center the ramp arrangement 40 which is secured to the casing with respect to the adjustable ramp arrangement 50 such that the spreaders 48 run without canting in the associated recesses presenting the ramps 46 of the two ramp arrangements 40 and 50.

The mode of operation of the actuating device is the same with all three embodiments shown. Upon hydraulic brake actuation at moderate pressure by which the floating caliper 10 and friction linings on the brake pads 14 and 16 are not deformed to a degree worth mentioning, the piston 30 is displaced in the direction of the brake disc 12. The sleeve-like strut member 64 fully accompanies the displacement of the piston 30 as long as this displacement does not exceed the thread clearance existing in the pair of coarse threads 62 between the strut members 60 and 64, which clearance corresponds to the brake release clearance provided. In other words, the set of spring washers 80 does not yield as yet.

However, if the distance to be covered by the piston 30 in order to press the brake pads 14 and 16 against the brake disc 12, is greater than the brake release clearance provided, because of the wear of the friction linings, then the bolt-like strut member 60 retained by the return spring 90 prevents the sleeve-like strut member 64 form carrying out the full shifting together with the piston 30 toward the brake disc 12 upon hydraulic actuation. Consequently the conical flange 76 of the sleeve-like strut member 64 is lifted slightly from the internal cone 78, against the resistance of the set of spring washers 80 which resistance is smaller than the bias of the return spring 90. Now, the sleeve-like strut member 64 is no longer prevented from rotating abouts its axis.

The axial force which is transmitted by the pair of coarse threads 62 and by which the bolt-like sleeve member 60 tries to hold back the sleeve-like strut member 64 has a circumferential component, i.e. produces a torque by which the sleeve-like strut member 64 is turned in a way so to become screwed off the bolt-like strut member 60 to some extent. For this reason the conical flange 76 once again comes to rest against the internal cone 78 of the piston 30. As the effective length of the strut formed by the two strut members 60 and 64 is somewhat greater now, the piston 30 is kept from returning all the way to its starting position when the brake application ends. The brake release clearance thus has been reduced once more to its design value.

If vigorous hydraulic brake actuation should create a pressure of, for instance, 20 bar or more within the cylindrical bore 26, it must be expected that elastic deformations will take place especially at the floating caliper 10 and the friction linings of the brake pads 14 and 16. Any readjustment compensating such preliminary deformation is undesired and, therefore, is prevented in the following manner:

The pressure in the cylindrical bore 26 acts also on the sleeve-like strut member 64 designed as an auxiliary piston. Upon vigorous hydraulic actuation, the axial forces exerted by the set of spring washers 80 and by the hydraulic pressure on the sleeve-like strut member 64 on the whole are greater than the force required by the thrust bearing 58 formed at the bolt-like strut member 60 in order to compress the return spring 90. The return spring 90 thus is no longer able to hold the bolt-like strut member 60 and thereby lift the flange 76 off the internal cone 78. The sleeve-like strut member 64 therefore continues to be prevented from rotating. For this reason the brakes are applied without any readjustment taking place. It is only when the hydraulic pressure has dropped below the threshold value mentioned of, e.g. 20 bar, that readjustment can be made in fact if it has become necessary because of the advanced wear of the linings of brake pads 14 and 16.

If the brake is to be actuated mechanically, such as for parking, the shaft 34 is turned by means of the lever 38. Consequently the spreaders 48 run up the ramps 46 of the two ramp arrangements 40 and 50, pressing the adjustable ramp arrangement 50 in the direction toward the brake disc 10. The adjustable ramp arrangement 50 exerts axial pressure through the axial load bearing 56 on the bolt-like strut member 60. Upon overcoming of the thread clearance, this force is transmitted by way of the pair of coarse threads 62, to the sleeve-like strut member 64 and from the latter, through its conical flange 76, to the internal cone 78 and therefore to the piston 30. During this process the sleeve-like strut member 64 is prevented from rotating. Upon mechanical actuation, therefore, the two strut members 60 and 64 present an entirely rigid strut.

What is claimed is:

1. An actuating device with automatic readadjustment for a vehicle brake, especially a disc brake, comprising a casing (20) which includes a bottom (22) and a shell (24) having a cylindrical bore (26) which is open toward the brake a piston (30) which is displace able hydraulically within the cylindrical bore (26) to actuate the brake, a shaft (34) for mechanical parking brake application which is rotatably supported in the bottom (22) of the casing, coaxially with the piston (30), and sealed, two ramp arrangements (40,50), one (40) being secured to the casing and the other one (50) rotatable by means of the shaft (34), thus being adjustable axially away from the bottom (22) of the casing, a pair of strut members (60,64) screwed together so as to form a readjustable strut between the axially adjustable ramp arrangement (50) and the piston (30), and a return spring (90) which is positioned under axial bias between a thrust bearing (92) secured to the casing and a thrust bearing (58) at one of the two strut members (60) and tends to keep the adjustable ramp arrangement (50) in an inoperative position, characterized in that the bottom (22) of the casing is made in one piece with the shell (24) of the casing, the ramp arrangement (40) which is secured to the casing is a plate which is separate from the bottom (22) of the casing and supported by the same, the thrust bearing (92) which is secured to the casing is formed at an insert (84) guiding one of the strut members (60) in non-rotatable manner, and the ramp arrangement (40) which is secured to the casing as well as the insert (84) are held against axial displacement in the casing (20) by a common fastening member (96) and prevented from rotating by a common twist preventing means (42).

2. The device as claimed in claim 1, characterized in that the common fastening member (96) is a radially resilient ring fitted in snap engagement behind an internal shoulder (98) of the casing (20).

3. The device as claimed in claim 2, characterized in that the internal shoulder (98) is a conical surface which faces the bottom (22) of the casing and by which the insert (84) and the ramp arrangement (40) secured to the casing are retained without axial clearance.

4. The device as claimed in claim 2 or 3, characterized in that the internal shoulder (98) intersects an at least approximately radial inlet duct (28) for hydraulic fluid so that the fastening member (96) is disengageable by means of a tool introduced through this inlet duct (28).

5. The device as claimed in one of claims 1 to 3, characterized in that the insert (84) is sleeve-like and houses the return spring (90) and at least the adjustable ramp assembly (50).

6. The device as claimed in claim 5,, characterized in that the insert (84) is fixed to the ramp arrangement (40) which is secured to the casing, and that the latter is secured to the casing (20) by the fastening member (96) and the twist preventing means (42).

7. The device as claimed in claim 5, characterized in that the insert (84) and the two ramp arrangements (40,50), the return spring (90), as well as the strut member (60) which supports the return spring (90) are joined in an assembly group which is held together by the fastening of the insert (84) at the ramp arrangement (40) secured to the casing and which is inserted as a whole in the cylindrical bore (26).

8. The device as claimed in claim 7, characterized in that the insert (84) is formed at its end remote from the thrust bearing secured to the casing (92) with lugs (102) which are bent radially inwardly and engage behind the ramp arrangement (40) secured to the casing, and between these radially inwardly bent lugs (102) and the thrust bearing secured to the casing (92) the insert (84) further is formed with lugs (104) which are bent radially outwardly and engage behind the fastening member (96).

9. The device as claimed in claim 8, characterized in that the insert (84) has a smaller diameter in the range between the thrust bearing secured to the casing (92) and the radially outwardly bent lugs (104) than in the range between the radially outwardly bent lugs (104) and the radially inwardly bent lugs (102).

10. The device as claimed in claim 1, characterized in that the twist preventing means is a paraxial pin (42) which is fixed in the bottom (22) of the casing and extends through a hole (110) which is formed in the ramp arrangement (40) secured to the casing and is oblong in radial direction.

* * * * *